United States Patent [19]

Hwang

[11] Patent Number: 5,285,141
[45] Date of Patent: Feb. 8, 1994

[54] CIRCUIT FOR PREVENTING ABNORMAL ROTATION OF A SPINDLE MOTOR

[75] Inventor: Yong-ha Hwang, Seoul, Rep. of Korea

[73] Assignee: SamSung Electronics Co. Ltd., Suwon, Rep. of Korea

[21] Appl. No.: 814,613

[22] Filed: Dec. 30, 1991

[30] Foreign Application Priority Data

Jan. 25, 1991 [KR] Rep. of Korea .............. 91-1296

[51] Int. Cl.$^5$ ................................. H02P 8/00
[52] U.S. Cl. ................... 318/608; 318/799; 318/809; 388/801; 388/813
[58] Field of Search ........... 318/809, 608, 606, 799; 388/812, 813, 801

[56] References Cited

U.S. PATENT DOCUMENTS

| | | | |
|---|---|---|---|
| 3,893,169 | 7/1975 | Hall, Jr. ...................... | 360/37 |
| 4,423,440 | 12/1983 | Tachi .......................... | 358/335 |
| 4,467,320 | 8/1984 | McPhee ................... | 340/347 SY |
| 4,555,734 | 11/1985 | Fukui ........................ | 358/314 |
| 4,614,981 | 9/1986 | Fukui ........................ | 358/337 |
| 4,623,939 | 11/1986 | Machida et al. ............ | 358/342 |
| 4,675,855 | 6/1987 | Iso et al. .................... | 369/32 |
| 4,739,230 | 4/1988 | Sonobe et al. .............. | 318/301 |
| 4,748,608 | 5/1988 | Matsumoto et al. ......... | 369/43 |
| 4,763,205 | 8/1988 | Okano ........................ | 358/337 |
| 4,815,063 | 3/1989 | Aoshima et al. ............ | 369/50 |
| 4,823,203 | 4/1989 | Narusawa .................. | 358/342 |
| 4,835,632 | 5/1989 | Shih et al. .................. | 360/78.04 |
| 4,855,847 | 8/1989 | Kanamaru .................. | 360/19.1 |
| 4,855,978 | 8/1989 | Kanamaru .................. | 369/32 |
| 4,885,644 | 12/1989 | Ishii et al. .................. | 358/342 |
| 4,908,810 | 3/1990 | Oie ............................ | 369/50 |
| 4,933,774 | 6/1990 | Ishimaru .................... | 358/335 |
| 4,947,264 | 8/1990 | Narusawa .................. | 358/337 |
| 5,027,048 | 6/1991 | Masrur et al. .............. | 318/806 |
| 5,051,674 | 9/1991 | Kim ............................ | 318/561 |

Primary Examiner—William M. Shoop, Jr.
Assistant Examiner—Brian Sircus
Attorney, Agent, or Firm—Robert E. Bushnell

[57] ABSTRACT

A circuit for controlling the velocity of the spindle motor in an electronic device using a disk is disclosed. Particularly, an abnormal rotation preventing circuit is disclosed which monitors the angular velocity of the spindle motor and forcibly controls it to rotate within a predetermined velocity range when it deviates from the predetermined range. The duty value of a phase difference between two signals among first, second and third phase control signals for driving a three-phase motor is measured. Then, the phase difference is counted and the velocity is sampled. An abnormal rotation control signal is generated when the sampled velocity deviates from the predetermined range. The motor's velocity is then forcibly controlled so as not to deviate from the predetermined range, thereby preventing abnormal rotation of the motor.

19 Claims, 3 Drawing Sheets

CIRCUIT FOR PREVENTING ABNORMAL ROTATION OF A SPINDLE MOTOR

BACKGROUND OF THE INVENTION

The present invention relates to a velocity control of a spindle motor which drives the rotation of a disk in an electronic device using a disk, and more particularly to a circuit for preventing an abnormal rotation.

Generally, a spindle motor is a motor to control the rotation of a disk used as a recording medium in a compact disk player (hereinafter referred to as "CD player") and applied devices thereof. Systems for controlling the velocity of the spindle motor at a constant linear velocity are used in such devices as a CD player, a CD-I, a CD-ROM, a CD-ROMXA, etc.

As for CD players, the spindle motor has an angular velocity of a certain range to maintain a constant linear velocity for the inner and outer circumferences of the disk. Also, since the constant linear velocity has a range of 1.2m/s to 1.4m/s, if the constant linear velocities during writing and reading are not the same, the data cannot be read properly. That is, the control of the linear velocity depends on the recorded data.

Conventionally, to control the spindle motor, the frequency and phase of a radio frequency (RF) signal read from an optical pickup are compared with a reference clock. Then, the phase difference is used as a control signal for a spindle servo, thereby controlling the velocity of its motor.

However, in the above case, when there is a vibration or a shock due to the outer environment, focusing is not correct. Accordingly, precise control of the linear velocity cannot be accomplished, so that the data recorded on the disk cannot be read properly. Then, a signal processor cannot make a phase-comparison, and accordingly the spindle motor may be speeding forward or backward in many cases. This is because the outer environment is not taken into account. Accordingly, a control circuit which can keep the angular velocity of the spindle motor within a constant range, even under abnormal conditions, is required to solve such a problem.

SUMMARY OF THE INVENTION

Accordingly, it is an object of the present invention to provide a circuit for preventing an abnormal rotation of a spindle motor by forcibly controlling the angular velocity of the spindle motor to be within the limits of a constant range.

To achieve the above object, there is provided a circuit for preventing an abnormal rotation of a spindle motor which rotates an optical disk, an optical pickup for reading out data from the optical disk, an amplifier for amplifying the signal read out by the optical pickup, a signal processor for comparing the output of the amplifier and a predetermined reference clock and calculating variations in the frequencies and phases, a servo for combining the variations calculated in the signal processor to generate a spindle motor control signal, and a motor driver for generating first, second and third phase control signals with respect to the spindle motor control signal, then driving the spindle motor using the phase control signals. The circuit for preventing an abnormal rotation of a spindle motor comprises;

a rotational velocity controller for selecting two of the three phase control signals which are the outputs of the motor driver and converting the two phase control signals into digital signals, and for measuring a duty value of their phase difference and, and for detecting the rotational velocity of the spindle motor from the duty value, and generating a control signal during an abnormal rotation to forcibly control the rotation number so as not to deviate from the determined range, thereby preventing abnormal rotation of the motor.

BRIEF DESCRIPTION OF THE DRAWINGS

The above object and other advantages of the present invention will become more apparent by describing the preferred embodiment of the present invention with reference to the attached drawings, in which.

DETAILED DESCRIPTION OF THE INVENTION

Hereinafter, the present invention will be described with reference to the accompanying drawings.

Figure 1:
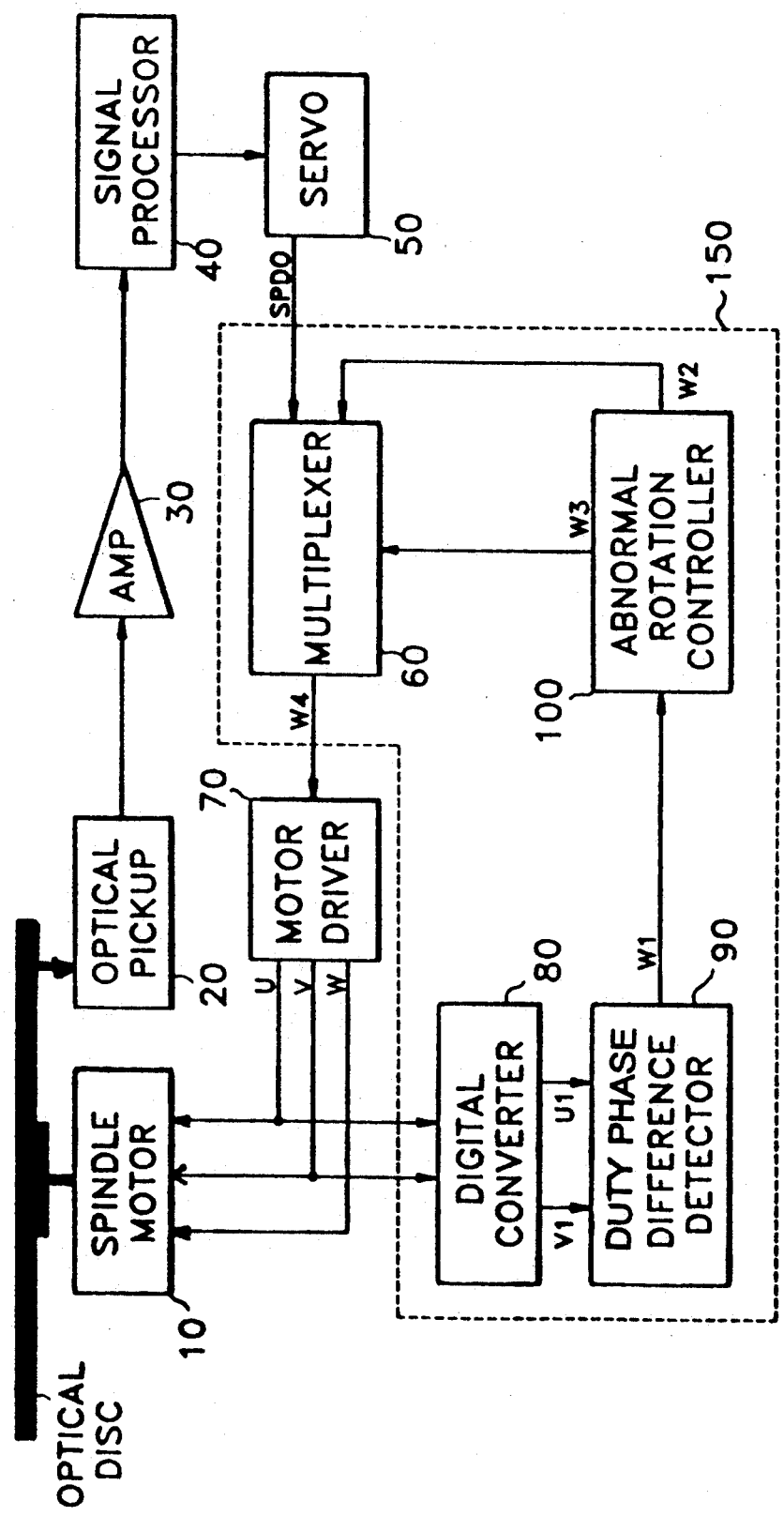
FIG. 1 is a block diagram showing an embodiment of a system for preventing abnormal rotation of a spindle motor according to the present invention.

FIG. 1 is a block diagram showing an embodiment of a system for preventing an abnormal rotation of a spindle motor according to the present invention, whose composition is as follows.

An optical disk is coupled to a spindle motor 10. An optical pickup 20 retrieves data from the optical disk and the output of the optical pickup is input to an amplifier 30 whose output is supplied to a signal processor 40. The output of the signal processor is input to a servo 50 whose output is input to a multiplexer 60. The output of the multiplexer is input to a motor driver 70. The outputs of the motor driver are input to the spindle motor and, in part, to a digital converter 80. The output of the digital converter is supplied to a duty phase difference detector 90. The output of the duty phase difference detector is input to an abnormal rotation controller 100 whose outputs are input to multiplexer 60.

Hereinafter, the operation according to the composition will be described. When spindle motor 10 is functioning normally, optical pickup 20 reads out a RF signal from the disk and transmits it to the amplifier. The amplifier amplifies the signal and supplies it to the signal processor. The signal processor 40 compares the phases of an internally generated reference clock and the data clock of the RF signal, and outputs the result to servo 50. The servo 50 receives the compared result and generates a spindle motor control signal SPDO for controlling a rotational number associated with the motor.

Meanwhile, in order to compare the phases of the first and second phase control signals U and V among the first, second and third analog phase control signals supplied to the input terminals of spindle motor 10 for driving the optical disk, digital converter 80 first performs a digital conversion to generate first and second digital phase control signals U1 and V1. Then, upon receiving the first and second digital phase control signals U1 and V1, duty phase difference detector 90 detects the duty value (an absolute magnitude) of the phase difference of the two signals. Here, since the first, second and third phase control signals U, V and W output from motor driver 70 always have phase differences of 120°, variations in the velocity can be known by measuring the duty value of the phase difference of any two of those signals.

Here, motor driver 70 is a three-phase, brushless motor which is a kind of spindle motor, and is driven by a driving voltage or current composed of three different phases.

Here, the three-phase control signals U, V and W are motor driving signals, having phase differences of 120°. Therefore, the digital first and second phase control signals U1 and V1 passed through the digital converter always have a phase difference of 120°. This phase difference is constant over variations in the rotational velocity, but the duty cycle of each phase control signal can be varied by vibration or a mechanical shock due to external circumstances, as shown in FIGS. 3B and 3C. The velocity is measured using this property. To measure the velocity, the "H" level of the output W1 of the duty phase difference detector 90 (showing the absolute magnitude or "duty value" of the phase difference) is counted by a binary counter. Thereafter, the counted value is compared with the upper and lower limits of the velocity, thereby measuring spindle motor velocity.

The abnormal rotation controller 100 counts the duty value of the detected phase difference and samples the counted value at every rising edge of V1 to determine whether it exceeds the upper or lower limit of the velocity, and if so, a control signal is generated. If not, the control signals W2 and W3 both become logic low signals and the spindle motor control signal SPDO passes through the multiplexer unchanged, and is input to the motor driver.

Here, as described above, since the angular velocity of a disk in a CD player is controlled by a constant linear velocity, when setting the upper and lower limits of the velocity, the angular velocity is linearly changed as the optical pickup moves between the innermost and outermost circumferences. Thus, the angular velocity of the innermost circumference is the upper limit of the linear range. Any velocity greater than this limit is considered an abnormal acceleration state. Conversely, the angular velocity of the outermost circumference is the lower limit of the linear range, and any velocity less than this limit is considered an abnormal deceleration state.

Figure 2:
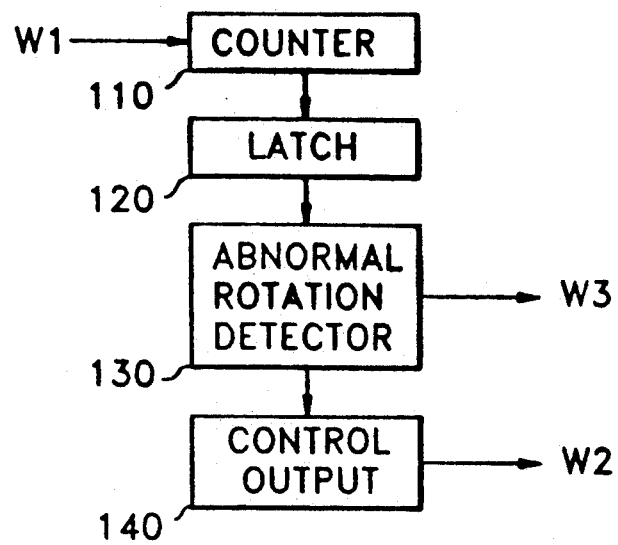
FIG. 2 is a more detailed block diagram of the abnormal rotation controller shown in FIG. 1.

Hereinafter, abnormal rotation controller 100 will be described in detail with reference to FIG. 2. First, counter 110 receives as an input the duty value of the phase difference and serves as a binary counter for counting the duty value. Here, during a high output state of duty phase difference detector 90, the counted value of the binary counter continuously increases. When output W1 goes low, the total value counted until that time is stored in a latch register 120. At this time, the stored value shows the magnitude of the phase difference.

The latch 120 samples the counted value at every rising edge of V1, and an abnormal rotation detector 130 determines whether the output value of the latch exceeds the upper or lower limit of the velocity. When it deviates from this range, a control output portion 140 discriminates whether it is an abnormal deceleration state or an abnormal acceleration state, and outputs the respective control signal.

Figure 3A:
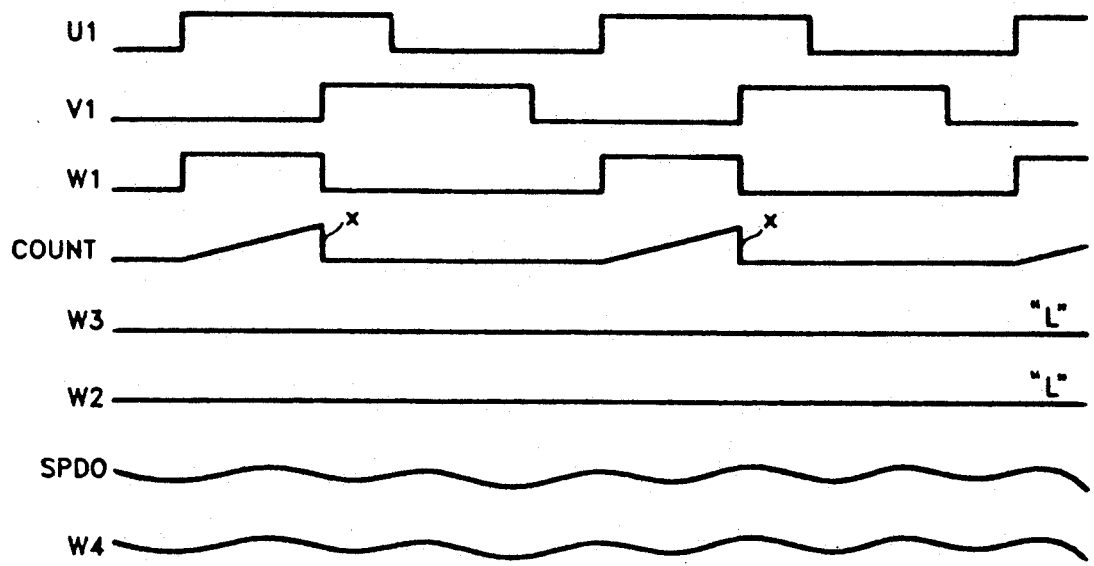
FIGS. 3A, 3B and 3C are output waveform diagrams of various blocks according to the present invention.
Figure 3B:
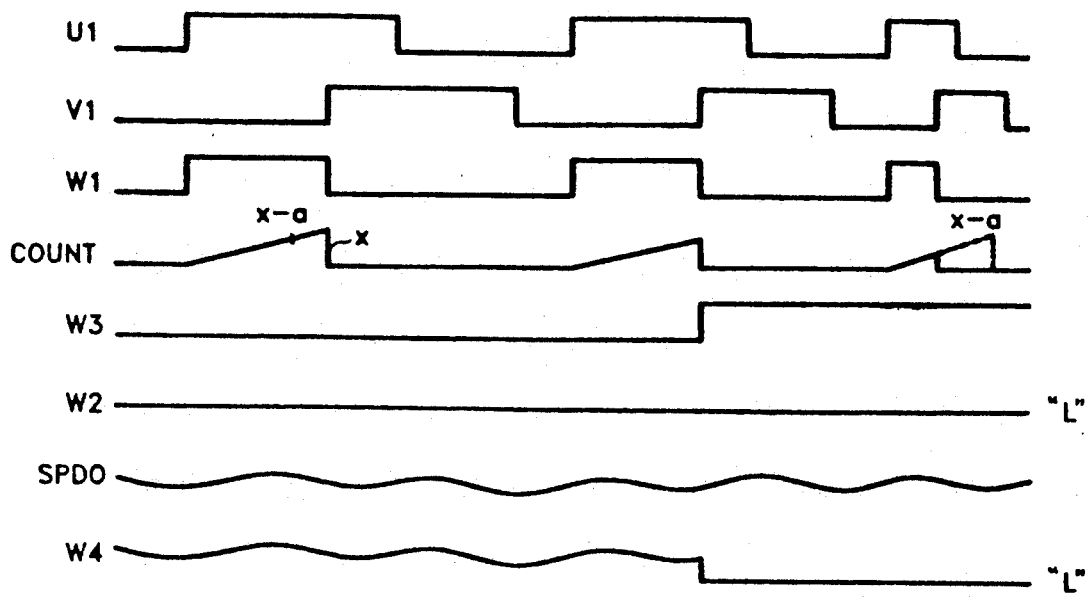
Figure 3C:
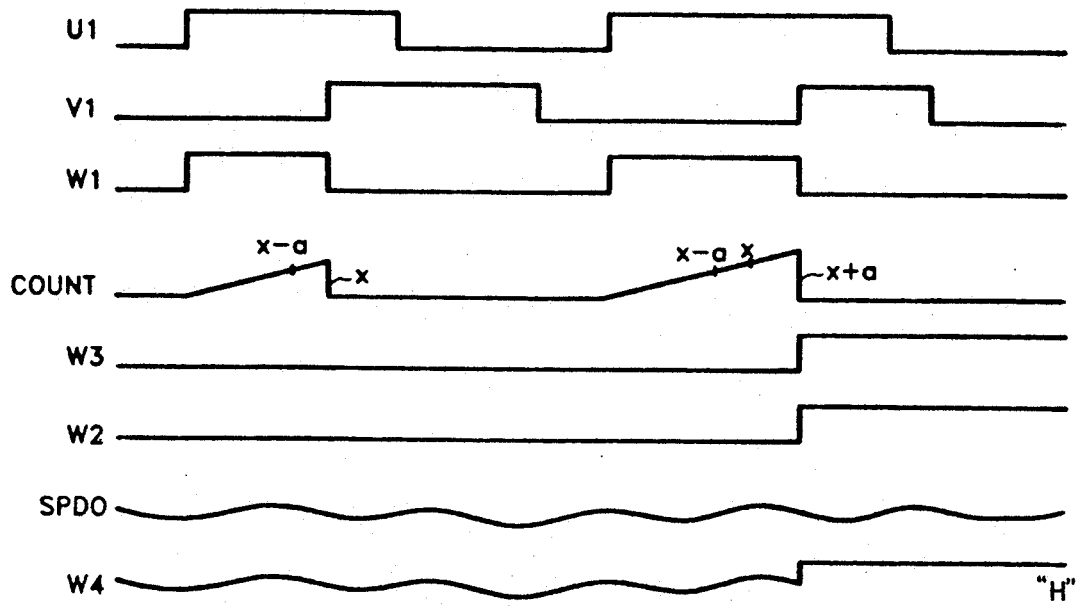

If the angular velocity of the spindle motor detected in the abnormal rotation controller is within the linear range, abnormal rotation detector 130 outputs a low logic abnormal rotation state detecting signal W3 as shown in FIG. 3A, and supplies it to a control terminal of the multiplexer 60 (FIG. 1). In doing so, multiplexer 60 selects the input signal SPDO, and outputs spindle motor control signal SPDO, as output W4. As a result, motor driver 70 drives the spindle motor at a normal velocity. The count shown in FIG. 3A shows that the counted value from binary counter 110 increases linearly, which does not correspond to the actual waveform. That is, the counted value is latched at the falling edge of W1 and is then reset. Since W3 and W2 are normally low, spindle motor control output SPDO is the normal W4 output.

As shown in FIG. 3B, if the angular velocity of spindle motor 10 exceeds the upper limit, binary counter 110 (which is a component of abnormal rotation controller 100) renders the counted value of phase difference detecting signal W1 smaller than the counted value of the upper limit velocity, i.e., x-a. Here, abnormal rotation detector 130 outputs a high-logic abnormal rotation state detecting signal W3 at the rising edge of the digital second phase control signal V1, i.e., a latch period, and control output portion 140 outputs a low-logic abnormal rotation control signal W2, and outputs it to the multiplexer. Then, the multiplexer selects the abnormal rotation control signal W2, thereby preventing further acceleration by forcibly decelerating the spindle motor regardless of the spindle motor control signal SPDO. That is, with respect to the abnormal rotation state detecting signal W3, multiplexer output W4 controls the current amplitude for driving the motor, thereby accelerating and decelerating the motor velocity.

As shown in FIG. 3C, when the rotational number of the spindle motor surpasses the lower limit, the counted value of the counter becomes large and abnormal rotation detector 130 outputs a high-logic abnormal rotation state detecting signal W3 at the rising edge of the digital second phase control signal V1, which constitutes the latch period. Accordingly, the multiplexer selects the high-logic abnormal rotation control signal W2 instead of spindle motor control signal SPDO and supplies it to the motor driver, thereby compulsively accelerating the spindle motor until normal linear velocity control is possible. Here, normal linear velocity control is defined as when the phase-locked loop using the data operates.

As described above, according to the present invention, when the angular velocity of a motor deviates from a constant range due to an outside impulse, an abnormal control signal is generated to control the angular velocity of the motor, thereby preventing abnormal rotation of the motor.

What is claimed is:

1. A circuit for preventing an abnormal rotation of a spindle motor in a spindle motor driving mechanism for rotating an optical disk, comprising:
   optical pickup means for reading out data from said optical disk to generate a radio frequency signal;
   amplifier means for amplifying said radio frequency signal to generate an amplified signal;
   signal processor means for comparing said amplified signal and a predetermined reference clock, and for calculating variations in frequencies and phases of said amplified signal;
   servo means for combining said variations calculated in said signal processor to generate a spindle motor control signal; and
   motor driver means for generating a plurality of phase current signals with respect to said spindle motor control signal and a first control signal, in order to drive the spindle motor;

rotational velocity controller means for selecting two of said plurality of phase current signals, and for measuring a duty value of a phase difference between said two of said plurality of phase current signals, and for detecting a rotational velocity of said spindle motor based on said duty value, and for generating said first control signal in response to said detection of the rotational velocity, to enable said motor driver means to forcibly control said rotational velocity so as not to deviate from a predetermined range, thereby preventing abnormal rotation of the spindle motor.

2. A circuit for preventing an abnormal rotation of a spindle motor as claimed in claim 1, wherein said rotational velocity controller comprises:

digital converter means for converting said two of said plurality of phase current signals to logic signals and producing first and second digital phase control signals;

duty phase difference detector means for detecting said duty value of said phase difference between said first and second digital phase control signals to generate a duty phase difference signal;

abnormal rotation controller means for detecting a rotational velocity of the spindle motor from said detected duty value and generating a second control signal and said first control signal; and a multiplexer for alternately enabling transmission of one of said spindle motor control signal and said first control signal to said motor driver means in response to said second control signal, for controlling said motor driver means.

3. A circuit for preventing an abnormal rotation of a spindle motor as claimed in claim 2, wherein said abnormal rotation controller means comprises:

counter means for receiving said duty phase difference signal, and for counting a duty value of said duty phase difference signal to generate a counting signal;

latch means for sampling said counting signal at each rising edge of one of said digital phase control signals to generate a latched signal;

abnormal rotation detector means for determining whether said latched signal deviates from an upper and lower limit of a normal rotation velocity and producing said second control signal showing whether an abnormal rotation exists; and control output means for discriminating an abnormal decelerating state and an abnormal accelerating state in response to said second control signal to generate said first control signal.

4. A circuit for controlling rotation of a spindle motor used to rotate an optical disk, said circuit comprising:

pickup means for reading a radio frequency signal off of the optical disk;

signal processor means for making a comparison between phases of an internally generated reference clock and said radio frequency signal to generate a comparison signal;

servo means for generating a spindle motor control signal in response to said comparison signal;

motor driver means for generating a plurality of phase current signals in response to said spindle motor control signal and a first control signal, in order to drive the spindle motor; and rotational velocity control means for comparing phases of a first and second one of said plurality of phase current signals, and for detecting a duty value of said phase difference between said first and second phase current signals, and for calculating a rotational velocity of the spindle motor, and for generating said first control signal to enable said motor driver means to maintain said rotational velocity of said spindle motor within a given range.

5. The circuit as claimed in claim 4, wherein said rotational velocity control means comprises:

digital conversion means for converting said first and second phase current signals to a first and second digital control signal, respectively;

duty phase difference detector means for detecting said duty value of said phase difference between said first and second phase current signals to generate a duty phase difference signal;

abnormal rotation control means for detecting said duty value of said phase difference, and for detecting when said duty value is above and below a predetermined range to generate a second control signal, and for determining whether said duty value is outside said predetermined range, to generate said first control signal; and switch means for alternately enabling transmission of one of said first control signal and said spindle motor control signal to said motor driver means in response to said second control signal.

6. The circuit as claimed in claim 5, wherein said abnormal rotation control means comprises:

counting means for counting said duty value of said duty phase difference signal to generate a counting signal;

sampling means for sampling said counting signal to generate a sampled signal;

abnormal rotation detector means for determining when said sampled signal is within said predetermined range to generate said second control signal; and control output means for determining if said sampled signal is above said predetermined range and if said sampled signal is below said predetermined range to generate said first control signal.

7. The circuit as claimed in claim 6, wherein said sampling means samples said counting signal at each rising edge of one of said first and second digital control signals.

8. The circuit as claimed in claim 6, wherein said counting means is reset at a falling edge of said duty phase difference signal.

9. The circuit as claimed in claim 7, wherein said counting means is reset at a falling edge of said duty phase difference signal.

10. A method of controlling a rotational velocity of a spindle motor used to rotate an optical disk, said method comprising:

generating a spindle motor control signal to control the spindle motor;

generating a plurality of phase current signals to drive the spindle motor in response to the spindle motor control signal and a first control signal;

converting a first and second one of said plurality of phase current signals to first and second digital control signals, respectively;

computing a duty value of a phase difference between said first and second digital control signals to generate a duty phase difference signal;

calculating a rotational velocity of the spindle motor in response to said duty phase difference signal;

determining whether said rotational velocity is within a given range to generate a second control signal;

determining whether said rotational velocity is below said given range and above said given range, respectively, in dependence upon said second control signal to generate said first control signal; and alternately enabling transmission of one of said spindle motor control signal and said first control signal to control the spindle motor in response to said second control signal.

11. The method as claimed in claim 10, wherein said step of calculating a rotational velocity of the spindle motor comprises:

receiving said duty phase difference signal; and counting the duty value of said duty phase difference signal to generate a counting signal.

12. The method as claimed in claim 11, wherein said step of determining whether said rotational velocity is within a given range comprises:

storing said counting signal to produce a stored signal;

sampling said stored signal to produce a sampled signal; and determining whether said sampled signal is within said given range.

13. The method as claimed in claim 10, wherein said step of determining whether said rotational velocity is within a given range comprises:

storing said counting signal to produce a stored signal;

sampling said stored signal to produce a sampled signal; and determining whether said sampled signal is within said given range.

14. A circuit for controlling rotation of a spindle motor used to rotate an optical disk, said circuit comprising:

pickup means for reading a radio frequency signal off of the optical disk;

signal processor means for making a comparison between phases of an internally generated reference clock and said radio frequency signal to generate a comparison signal;

servo means for generating a spindle motor control signal in response to said comparison signal;

motor driver means for generating three analog phase current signals in response to said spindle motor control signal and a first control signal, in order to drive the spindle motor;

switch means for alternately enabling transmission of one of said spindle motor control signal and said first control signal to said motor driver means in dependence upon a second control signal;

conversion means for converting two of said three analog phase current signals to first and second digital phase control signals;

duty phase difference detector means for detecting a duty value of a phase difference between said first and second digital phase control signals to generate a duty phase difference signal;

means for integrating said duty phase difference signal to generate an integrated signal;

abnormal rotation means detector means for determining when said integrated signal is within a given range to generate said second control signal; and control means for determining if said integrated signal is above said given range, and for determining if said integrated signal is below said given range, to generate said first control signal.

15. The circuit as claimed in claim 14, wherein said switch means enables transmission of said spindle motor control signal when said integrated signal is within said given range, said switch means enables transmission of said first control signal having a first state when said integrated signal is below said given range, and said switch means enables transmission of said first control signal having a second state when said integrated signal is above said given range.

16. A method of controlling a rotational velocity of a spindle motor used to rotate an optical disk, said method comprising:

generating a spindle motor control signal;

generating three phase current signals from a motor driver to drive the spindle motor in response to a spindle motor control signal and a first control signal;

converting a first and second one of said three phase current signals to first and second digital control signals, respectively;

generating a duty phase difference signal corresponding to a duty value of a phase difference between said first and second digital control signals;

generating an integrated signal by integrating said duty value;

generating said first control signal if said integrated signal is outside a given range;

enabling transmission of said spindle motor control signal to said motor driver if said integrated signal is within said given range, and enabling transmission of said first control signal to said motor driver if said integrated signal is outside of said given range.

17. A circuit for preventing an abnormal rotation of a spindle motor in a spindle motor driving mechanism for rotating an optical disk, comprising:

optical pickup means for reading out data from said optical disk to generate a radio frequency signal;

amplifier means for amplifying said radio frequency signal to generate an amplified signal;

signal processor means for comparing said amplified signal and a predetermined reference clock, and for calculating variations in frequencies and phases of said amplified signal;

servo means for combining said variations calculated in said signal processor means to generate a spindle motor control signal; and motor driver means for generating first, second and third phase current signals in dependence upon said spindle motor control signal and a first control signal, in order to drive the spindle motor;

rotational velocity controller means for selecting two of said three phase current signals, and for measuring a duty value of a phase difference between said two of said three phase current signals, and for detecting a rotational velocity of said spindle motor based on said duty value, and for generating said first control signal in response when the rotational velocity is outside of a predetermined range, to enable said motor driver means to forcibly control said rotational velocity to be within said predetermined range, thereby preventing abnormal rotation of the spindle motor.

18. A circuit for preventing an abnormal rotation of a spindle motor as claimed in claim 1, wherein said rotational velocity controller comprises:
   digital converter means for converting said two of said plurality of phase current signals to logic signals and producing first and second digital phase control signals;
   duty phase difference detector means for detecting said duty value of said phase difference between said first and second digital phase control signals to generate a duty phase difference signal;
   abnormal rotation controller means for detecting a rotational velocity of the spindle motor from said detected duty value and generating a second control signal and said first control signal; and
   a multiplexer for alternately enabling transmission of one of said spindle motor control signal and said first control signal to said motor driver means in response to said second control signal, to control said motor driver means.

19. A circuit for preventing an abnormal rotation of a spindle motor in a spindle motor driving mechanism for rotating an optical disk, comprising:
   optical pickup means for reading out data from the optical disk to generate a radio frequency signal;
   processing means for comparing said radio frequency signal and a predetermined reference clock, to calculate variations in frequencies and phases of said radio frequency signal;
   servo means for combining said variations calculated in said processing means to generate a spindle motor control signal;
   motor driver means for generating a first, a second and a third phase current signal in dependence upon said spindle motor control signal and a first control signal, to drive the spindle motor;
   means for converting two of said first, second and third phase current signals into first and second digital control signals;
   duty phase difference detector means for detecting a duty value of a phase difference between said first and second digital control signals to generate a duty phase difference signal;
   abnormal rotation control means for detecting a rotational velocity of the spindle motor from said duty phase difference signal, determining whether said rotational velocity is within a predetermined range to generate a second control signal, and determining whether said rotational velocity is one of greater and less than said predetermined range if said rotational velocity is determined to be outside said predetermined range to generate said first control signal; and
   switch means for alternately enabling transmission of one of said spindle motor control signal and said first control signal to said motor driver means in response to said second control signal.

* * * * *